United States Patent
Carlström

(10) Patent No.: US 6,450,547 B1
(45) Date of Patent: Sep. 17, 2002

(54) PIPE COUPLING FOR PLASTIC PIPES

(75) Inventor: Börge Carlström, Höganäs (SE)

(73) Assignee: C-tech Ltd, Manama (BH)

( * ) Notice: Subject to any disclaimer, the term of this patent is extended or adjusted under 35 U.S.C. 154(b) by 0 days.

(21) Appl. No.: 09/868,936
(22) PCT Filed: Jan. 19, 2000
(86) PCT No.: PCT/EP00/00405
§ 371 (c)(1), (2), (4) Date: Jul. 18, 2001
(87) PCT Pub. No.: WO00/43706
PCT Pub. Date: Jul. 27, 2000

(30) Foreign Application Priority Data

Jan. 22, 1999 (DE) .......................... 199 02 456

(51) Int. Cl.[7] .................. F16L 17/02; F16L 47/00
(52) U.S. Cl. ................ 285/110; 285/369; 285/230; 285/370
(58) Field of Search ................ 285/369, 230, 285/110, 112, 370, 371

(56) References Cited

U.S. PATENT DOCUMENTS

| | | | | |
|---|---|---|---|---|
| 2,896,976 A | * | 7/1959 | Wiltse | 285/230 |
| 3,334,928 A | * | 8/1967 | Schmunk | 285/110 |
| 3,430,989 A | * | 3/1969 | Wendt | 285/110 |
| 3,682,503 A | * | 8/1972 | Bloom | 285/369 |
| 3,730,562 A | * | 5/1973 | Viazzi | 285/110 |
| 4,174,125 A | | 11/1979 | Wyss | |
| 4,229,028 A | * | 10/1980 | Gray | 285/369 |
| 4,329,193 A | * | 5/1982 | Sznopek et al. | 285/423 |
| 4,513,996 A | | 4/1985 | Jost | |
| 4,642,156 A | * | 2/1987 | Jost | 156/425 |
| 4,643,465 A | * | 2/1987 | Green et al. | 285/236 |
| 5,180,197 A | * | 1/1993 | Thompson, Jr. | 285/369 |
| 5,306,458 A | | 4/1994 | Carlstrom et al. | |
| 5,330,238 A | | 7/1994 | Carlstrom | |
| 5,362,528 A | * | 11/1994 | Carlstrom | 428/34.5 |
| 5,758,906 A | * | 6/1998 | Carlstrom et al. | 285/112 |

FOREIGN PATENT DOCUMENTS

| | | |
|---|---|---|
| EP | 0787937 | 8/1997 |
| FR | 2331737 | 6/1977 |

OTHER PUBLICATIONS

"Centrifugal Processes for Rotationally Symmetrical GFK [Glass Fibre–Reinforced Synthetic Material] Bodies", Bryde, AVK, Freudenstadt, Oct. 1977 pp 1–21 with English translation.

* cited by examiner

Primary Examiner—Eric K. Nicholson
(74) Attorney, Agent, or Firm—Dennison, Schultz & Dougherty

(57) ABSTRACT

A pipe coupling according to the invention comprises a socket (2) of glass-fiber reinforced plastics material and a membrane (4) of elastic material which is formed at at least one end as a seal and comprises a sleeve section (8). Where the membrane is formed as a seal, it has at the end where the pipe (20) is to be introduced (thus at the outer end), a short cylindrical band (14). In the cylindrical band the membrane has a constant wall thickness, which is backed by the glass-fiber reinforced socket material of the pipe coupling.

11 Claims, 1 Drawing Sheet

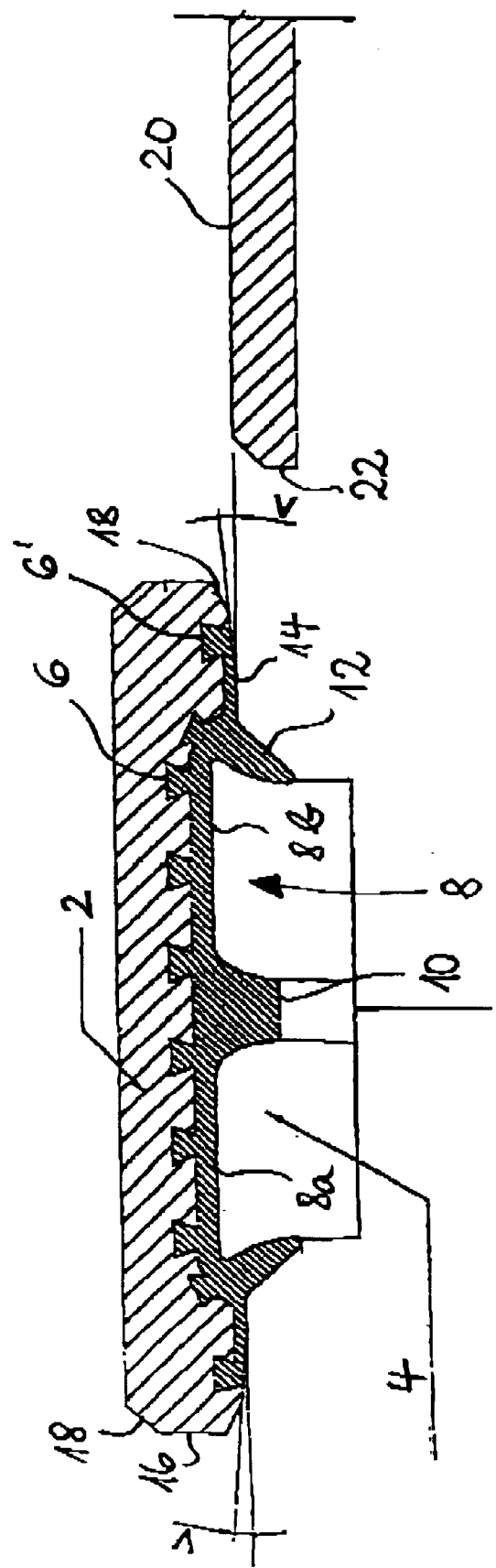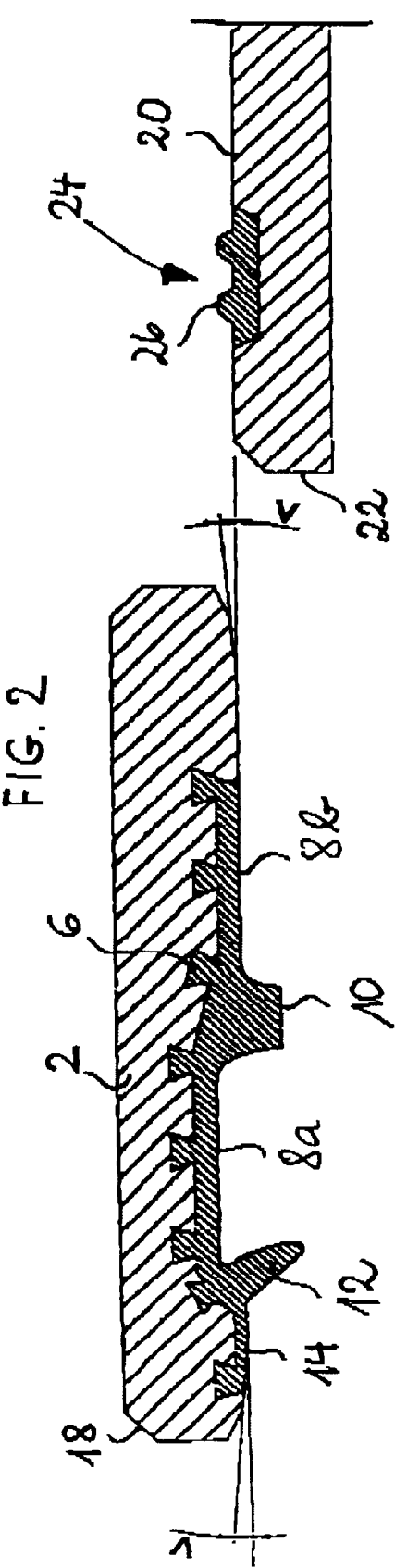

PIPE COUPLING FOR PLASTIC PIPES

BACKGROUND OF THE INVENTION

The invention relates to a pipe coupling of glass-fibre reinforced plastics material and a membrane of elastic material which is formed as a seal at least at one end.

From EP 0 651 506 B1 there is known a socket provided with a sealing sleeve for the connection of two plastics pipes, which is developed from a prior art coupling in which the two identically formed part sections each for the receiving of a pipe end are substantially equal in length. The known socket has two significantly different length cylindrical end sections (e.g. preferably with length ratio 1:3 and smaller) and between these is an annular recess in which the sealing sleeve is set. The sealing sleeve has at each end section a sealing lip between which extends a cylindrical section. This is divided by a rib which projects into the interior of the socket into a shorter part adjacent to the longer end region and into a longer part adjacent to the shorter end region.

From U.S. Pat. No. 4,642,156 there is known a method for the manufacture of a sealing sleeve which comprises a stop rib and sealing lips, but no cylindrical section.

SUMMARY OF THE INVENTION

It is the object of the invention to provide a pipe coupling which can be used at high pressures, particularly internal pressures of 25 to 50 bar, without causing damage to the coupling by expansion of the pipe as a result of increased internal pressure, and wherein the pipe coupling can be used also with offset and/or angled pipe axes.

A pipe coupling according to the invention comprises a socket of glass-fibre reinforced plastics material and a membrane of elastic material which is formed as a seal at at least one end and comprises a sleeve section. Where the membrane is formed as a seal, at the end of the membrane, where the pipe is to be introduced (i.e. at the outer end), there is a short cylindrical band of the membrane. In the cylindrical band the membrane has a constant wall thickness, which is backed by the glass-fibre reinforced socket material of the pipe coupling.

The pipe coupling of the present invention is suitable for use at high pressures, approximately 15 to 50 bar (depending upon the pipe diameter). With the structure of the pipe coupling provided according to the invention, a reliable connection and sealing of plastics pipes, particularly GFK pipes based on glass-fibre reinforced plastics material, is possible because the short cylindrical band frees the sealing portion from load. Because of the short length of this membrane section, in the event of expansion, i.e. widening of the pipe in diameter, this section expands in the longitudinal direction in response thereto, as a reaction, with the result that the socket is not mechanically stressed by the widening of the pipe. The expansion stroke of the pipe directed towards the socket is thus counterbalanced.

If the cylindrical section is arranged at a small angle, then an angled orientation of a connected pipe is possible. However, a disadvantageous pressure is then exerted on the socket.

Preferably, outside the cylindrical band, the further structure of the pipe coupling is such that an angle is present which is at least as large as the permitted angled orientation of the coupling, and the membrane is anchored in the socket over this angled part. This makes possible the connection of pipes even with longitudinal axes which are offset relative to one another and/or extend at an angle.

Alternatively, only one end may be provided with an angled configuration as mentioned above, with the other end permitting no angled orientation of a pipe. Then, there is basically an angled orientation between pipe and coupling at the one end and at the other end only a telescopic movement of the pipe located in the coupling is possible.

Preferably, the dimensioning of the materials is such that with an internal pressure in the pipe of 1.0×PN (0.98 bar) up to 1.5×PN (1.47 bar) the pipe is in contact with the cylindrical band of the pipe coupling without pressure.

At the end where no angled orientation is provided for, the seal can be provided by a ring of elastic material with sealing elements fitted at the forward end of a pipe to be coupled, and the sealing elements effect a seal with the membrane of elastic material of the coupling.

Preferably, the membrane and/or the ring provided with sealing elements is or are of rubber which ensures a particularly reliable sealing against the passage of foreign material.

BRIEF DESCRIPTION OF THE DRAWINGS

The invention will now be described by means of examples and with reference to the drawings. These are intended to illustrate the scope of the invention and should not be interpreted in any limiting sense. In the drawings:

FIG. 1 is a schematic sectional view through a pipe coupling which is made according to a first embodiment of the invention; and FIG. 2 is a schematic sectional view through a pipe coupling which is made according to a second embodiment of the invention.

DESCRIPTION OF THE PREFERRED EMBODIMENTS

FIG. 1 shows a pipe coupling which permits an angled orientation between pipe and coupling at both ends. The pipe coupling comprises a substantially cylindrical socket 2 of glass-fibre reinforced plastics material. On its inside the socket has a recess in which a membrane 4 of elastic material, here rubber, is received to serve as a seal. The membrane 4 is anchored in the socket 2 by means of annular beads 6. It has a central cylindrical sleeve section 8 which is divided into two substantially equal length sleeve sections 8a, 8b by an inwardly projecting rib 10. The central sleeve section 8 is bounded by two sealing lips 12. Outside the sealing lips 12 there extends at each end a short cylindrical band 14 of reduced wall thickness which is anchored at the end by one 6' of the aforementioned annular beads 6. The internal diameter of the short cylindrical bands 14 is smaller than that of the central cylindrical sleeve section 8. From the region of the outermost annular bead 6' the end of the socket tapers at an angle V, with the socket having at each end a chamfer 18 at the transitions from the taper to the end faces 16. In FIG. 1, at the right-hand side, there is shown schematically a part of a wall of a pipe or pipe end 20 which is to be connected by the pipe coupling.

As is evident from the drawing, the external wall of the pipe 20 is substantially in alignment with the wall of the short cylindrical band 14. When the pipe 20 is pushed in, the sealing lip 12 is flattened, thereby achieving a sealing action, and with the sealing lip material being compressed. Provided that the pipe 20 is pushed into the pipe coupling sufficiently far, in its final position it has its end face 22 abutting against the rib 10. Due to the possibility of angled orientation through the angle V it is possible, upon inserting the pipe 20, to introduce the pipe at an appropriate angle, maximum V, to the longitudinal axis of the coupling, with the result that one can compensate for tolerances caused for example by the installation.

In the embodiment according to FIG. 2, one of the two sealing lips 12 of the central sleeve section 8 of the membrane 4 of the first embodiment is omitted (here the right-hand sealing lip). The sleeve section 8b which here lies at the opposite end to the sealing lip 12 has a smaller internal diameter than the sleeve section 8a between the sealing lip 12 and the rib 10. The outer wall of the membrane 4 in the region of the rib tapers inwardly towards the plain sleeve section 8b. At the outside of the sealing lip 12 there is a short cylindrical band 14 as in the embodiment described above. Adjacent to the plain section 8b of the central sleeve section there is an inner wall region of the socket 2 which is aligned with the inner wall of the plain sleeve section 8b. The angled nature of the socket at the outer ends (angle V) and the chamfers 18 are provided as in the embodiment described above.

The pipe 20, which here again is only shown schematically, has a somewhat greater wall thickness. Spaced somewhat from the end face 22 of the pipe there is located an annular recess in which a sealing ring 24 of rubber is fitted. The sealing ring 24 comprises two spaced annular beads 26 which serve as sealing elements. These come into sealing engagement with the plain section 8b of the central sleeve section 8 when the pipe is pushed into the long end of the coupling.

As mentioned above, the sealing at the long end of the coupling is maintained by the rubber ring 24. As FIG. 2 shows, the sealing is maintained by two solid annular beads. Alternatively, lip seals or a combination of semi-cylindrical beads and lips could be used. The rubber ring 24 is so positioned that the seal is effected against the rubber membrane 4 in the coupling. The reason for this will be explained hereinafter.

At the short end of the coupling, the sealing is effected by the lip 12 which is a part of the rubber membrane 4. The rubber membrane 4 is extended sufficiently far that it goes beyond the sleeve section 8.

The dimensioning is so planned that with an internal pressure of 1.0×PN to 1.5×PN (nominal pressure: 0.98 to 1.47 bar) the gaps between the internal diameter of the cylindrical band 14 and the external diameter of the pipe 20 (FIG. 1) and between the internal diameter of the plain sleeve section 8b and the pipe external diameter (FIG. 2) are zero. If this dimensioning is adopted, then with a nominal pressure PN the elongation as a result of internal pressure has a certain established value. Unfortunately, this value is not always constant, but has large deviations. This leads to creepage with time. It can happen that in use the pipe ends press tremendously against the coupling. Because of this the rubber ring 24 at the end of the pipe must press against the rubber membrane 4, since here otherwise forces which are too large would occur in the coupling. At the small end (which has the sealing lip 12) it is sufficient if rubber of sufficient thickness is provided for the cylindrical band 14. The thickness should be at least 2 mm. It is important that the cylindrical band 14 is very short, so that the rubber can extend in the longitudinal direction if pressed too hard. An important dimension is that of the angle V. This should be equal to the permitted angled orientation of the coupling. The rubber membrane 4 should on top of that be anchored in the sleeve portion in this region.

It is important that the anchoring of the short cylindrical band 14 is in the angled part and not in the cylindrical part, since resin can penetrate under the rubber at the angle, which would be dangerous if such resin was present in the cylindrical part.

In order to prevent such penetration, it is advantageous if the angle V is smaller in section than the planned angle.

What is claimed is:

1. Pipe coupling comprising:

an outer socket of glass-fibre reinforced plastics material having a first end and a second end, an outer diameter and an inner diameter, and an outer surface and an inner surface; and an inner membrane of elastic material which is attached to the inner surface of the socket from a point adjacent to a recessed from the first end to a point adjacent to and recessed from the second end, and comprising a central sleeve section and, near at least one end of the membrane, a receiving portion for a pipe inserted therein, said receiving portion comprising a cylindrical band of the membrane of constant inner diameter which extends to and is anchored in an end of the socket at which the inner wall of the socket is chamfered outwardly to increase the inner diameter such that an angle V is formed between the inner surface of the socket and the inner surface of the chamfered portion.

2. Pipe coupling according to claim 1, wherein an internal pressure in the pipe of 1.0×nominal pressure to 1.5×nominal pressure, or, results in a coupled pipe being in contact with the cylindrical band of the pipe coupling without pressure.

3. Pipe coupling according to claim 1, wherein only the first end of said of said outer socket is chamfered.

4. Pipe coupling according to claim 3, wherein at the second end sealing means is provided by a ring of elastic material with sealing elements fitted at a forward end of a pipe to be coupled, the sealing elements sealing against the membrane of elastic material in the coupling.

5. Pipe coupling according to claim 3, wherein at the second end a pipe to be coupled comprises at a forward end thereof a sealing lip with sealing of the sealing lip against the membrane of elastic material.

6. Pipe coupling according to claim 1, wherein the membrane comprises rubber.

7. Pipe coupling according to claim 4, wherein the ring comprises rubber.

8. Pipe coupling according to claim 1, wherein said inner membrane additionally comprising an annular rib disposed centrally between the first end and the second end.

9. Pipe coupling according to claim 1, wherein the receiving portion is defined by a first end anchored in the end of the socket and a second end defined by a sealing lip.

10. Pipe coupling according to claim 1, wherein the membrane has an inner diameter which is reduced at the receiving portion.

11. In combination, 1) a pipe coupling comprising:

an outer socket of glass-fibre reinforced plastics material having a first end and a second end, an outer diameter and an inner diameter, and an outer surface and an inner surface; and an inner membrane of elastic material which is attached to the inner surface of the socket from a point adjacent the first end to a point adjacent the second end, and comprising a central sleeve section and, near at least one end of the membrane, a receiving portion for a pipe inserted therein, said receiving portion comprising a cylindrical band of the membrane of constant inner diameter which extends to and is anchored in an end of the socket at which the inner wall of the socket is chamfered outwardly to increase the inner diameter such that an angle V is formed between the inner surface of the socket and the inner surface of the chamfered portion, and 2) a pipe for receipt an end of the socket comprising a sealing means provided by a ring of elastic material with sealing elements fitted at a forward end of the pipe, the sealing elements sealing against the membrane of elastic material in the receiving portion.

\* \* \* \* \*